US010776766B2

(12) United States Patent
Purves

(10) Patent No.: US 10,776,766 B2
(45) Date of Patent: Sep. 15, 2020

(54) ACCEPTING ISSUER CREDENTIALS AT CHECKOUT

(71) Applicant: Thomas Purves, San Francisco, CA (US)

(72) Inventor: Thomas Purves, San Francisco, CA (US)

(73) Assignee: VISA INTERNATIONAL SERVICE ASSOCIATION, San Francisco, CA (US)

( * ) Notice: Subject to any disclaimer, the term of this patent is extended or adjusted under 35 U.S.C. 154(b) by 290 days.

(21) Appl. No.: 15/418,552

(22) Filed: Jan. 27, 2017

(65) Prior Publication Data

US 2017/0213200 A1    Jul. 27, 2017

Related U.S. Application Data

(60) Provisional application No. 62/287,754, filed on Jan. 27, 2016.

(51) Int. Cl.
*G06Q 20/20* (2012.01)
*G06Q 20/40* (2012.01)
(Continued)

(52) U.S. Cl.
CPC ........... *G06Q 20/204* (2013.01); *G06Q 20/12* (2013.01); *G06Q 20/206* (2013.01);
(Continued)

(58) Field of Classification Search
CPC .... G06Q 20/204; G06Q 20/12; G06Q 20/206; G06Q 20/227; G06Q 20/401; G07G 1/01; G06F 3/0481; G06F 3/04883
(Continued)

(56) References Cited

U.S. PATENT DOCUMENTS 8,355,988 B2    1/2013  Powell
8,788,418 B2    7/2014  Spodak
(Continued)

FOREIGN PATENT DOCUMENTS

GB    2477412    8/2011

OTHER PUBLICATIONS

E-Commerce Special Interest Group/PCI Security Standards Council, Information Supplement: PCI DSS E-commerce Guidelines, Version 2.0, Jan. 2013, pp. 1-39.
(Continued)

*Primary Examiner* — Luna Champagne
(74) *Attorney, Agent, or Firm* — Loeb & Loeb LLP

(57) ABSTRACT

A computer-implemented method presents on a merchant checkout graphical user interface associated with a payment processor widget. The payment processor widget determines affiliations of a plurality of accounts and a plurality of issuers of a user. The payment processor widget via the merchant checkout graphical user interface defines at least one selectable graphic configured for receiving interactions of the user on the selectable graphic. In response to receiving the selection of the selectable graphic, the payment processor widget presents a field within the merchant checkout graphical user interface for receiving a credential from the user associated with an authentication widget of the particular issuer. The authentication widget communicates the credential to the particular issuer for authentication of the user. In response to receiving a successful authentication indicator from the particular issuer, the payment processor widget displays a message indicating that a transaction was approved.

20 Claims, 6 Drawing Sheets

(51) Int. Cl.
  *G06Q 20/22* (2012.01)
  *G07G 1/01* (2006.01)
  *G06Q 20/12* (2012.01)
  *G06F 3/0488* (2013.01)
  *G06F 3/0481* (2013.01)

(52) U.S. Cl.
  CPC ......... *G06Q 20/227* (2013.01); *G06Q 20/401* (2013.01); *G07G 1/01* (2013.01); *G06F 3/0481* (2013.01); *G06F 3/04883* (2013.01)

(58) Field of Classification Search
  USPC ......................................................... 705/17
  See application file for complete search history.

(56) References Cited

U.S. PATENT DOCUMENTS

| | | | | |
|---|---|---|---|---|
| 9,183,552 | B2 | 11/2015 | Kauniskangas | |
| 9,230,254 | B1 | 1/2016 | Sharifi | |
| 9,679,426 | B1* | 6/2017 | Jones-McFadden | .... H04W 4/90 |
| 2011/0035319 | A1* | 2/2011 | Brand | ................... G06Q 20/10 |
| | | | | 705/44 |
| 2011/0161201 | A1* | 6/2011 | Stocker | ................. G06Q 20/12 |
| | | | | 705/27.1 |
| 2013/0060693 | A1 | 3/2013 | Oskolkov | |
| 2013/0124415 | A1 | 5/2013 | Mardikar | |
| 2013/0161384 | A1 | 6/2013 | Hanson | |
| 2015/0227929 | A1 | 8/2015 | Anand | |
| 2015/0356551 | A1* | 12/2015 | Dogin | ................. G06Q 20/204 |
| | | | | 705/17 |
| 2016/0098708 | A1* | 4/2016 | Loomis | ................ G06Q 20/367 |
| | | | | 705/39 |

OTHER PUBLICATIONS

Stack Overflow, "iframe in iframe won't load," available at http://stackoverflow.com/questions/14478640/iframe-in-iframe-wont-load, 2 pages.

Stack Overflow, "How to authenticate 3rd party website via iframe call," available at http://stackoverflow.com/questions/20815957/how-to-authenticate-3rd-party-website-via-iframe-call, 4 pages.

European Supplementary Search Report for EP17745043.4, dated Nov. 9, 2018, 9 pages.

International Searching Authority, "International Search Report and Written Opinion," issued in connection with application No. PCT/US2017/15493, dated Apr. 10, 2017, 10 pages.

* cited by examiner

ACCEPTING ISSUER CREDENTIALS AT CHECKOUT

CROSS-REFERENCE TO RELATED APPLICATION

This is application is an US nonprovisional patent application of and claims priority to a US provisional patent application, Ser. No. 62/287,754 filed on Jan. 27, 2016, whose disclosure is incorporated by reference in its entirety herein.

BACKGROUND

Field of the Invention

The invention relates to systems and methods for accepting issuer credentials at checkout.

Description of Related Art

Existing systems for accepting payment are deficient and create friction for consumers.

BRIEF DESCRIPTION OF THE DRAWINGS

The invention may be better understood by reference to the detailed description when considered in connection with the accompanying drawings. The components in the figures are not necessarily to scale, emphasis instead being placed upon illustrating the principles of the invention. In the figures, like reference numerals designate corresponding parts throughout the different views.

Figure 1:
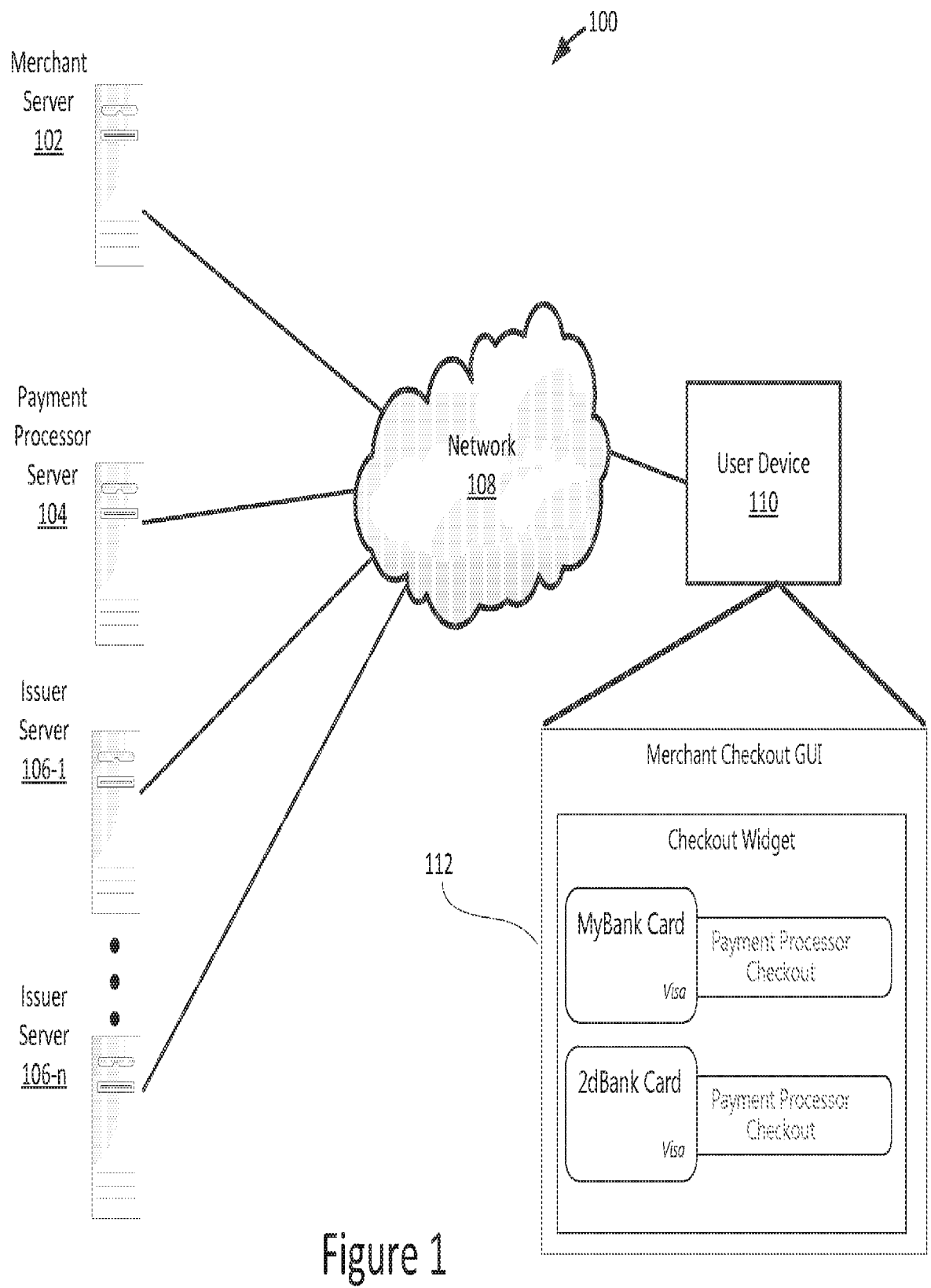
FIG. 1 shows a block diagram illustrating example aspects of a system in accordance with example embodiments.

Persons of ordinary skill in the art may appreciate that elements in the figures are illustrated for simplicity and clarity so not all connections and options have been shown to avoid obscuring the inventive aspects. For example, common but well-understood elements that are useful or necessary in a commercially feasible embodiment are not often depicted in order to facilitate a less obstructed view of these various embodiments of the present disclosure. It will be further appreciated that certain actions and/or steps may be described or depicted in a particular order of occurrence while those skilled in the art will understand that such specificity with respect to sequence is not actually required. It will also be understood that the terms and expressions used herein are to be defined with respect to their corresponding respective areas of inquiry and study except where specific meanings have otherwise been set forth herein.

DETAILED DESCRIPTION

The present invention may now be described more fully with reference to the accompanying drawings, which form a part hereof, and which show, by way of illustration, specific exemplary embodiments by which the invention may be practiced. These illustrations and exemplary embodiments may be presented with the understanding that the present disclosure is an exemplification of the principles of one or more inventions and may not be intended to limit any one of the inventions to the embodiments illustrated. The invention may be embodied in many different forms and should not be construed as limited to the embodiments set forth herein; rather, these embodiments are provided so that this disclosure will be thorough and complete, and will fully convey the scope of the invention to those skilled in the art. Among other things, the present invention may be embodied as methods, systems, computer readable media, apparatuses, or devices. Accordingly, the present invention may take the form of an entirely hardware embodiment, an entirely software embodiment, or an embodiment combining software and hardware aspects. The following detailed description may, therefore, not to be taken in a limiting sense.

It is to be understood that analysts of all disciplines, either in a scientific field, social science studies, manufacturing, etc., constantly face with plethora of data to identify and process. Part of these analyses is to generate insights out of different datasets. There are many approaches, but one of the approach is to identifying correlations between datasets. In such an attempt, one may perform a join operation of two or more datasets stored in database storage or structures. The "join" operation may be part of database programming and such operation typically includes a syntax and a set of required parameters for a database oriented computer, such as a database server, to execute and generate results. When the datasets are small, the joining operation does not take very long, and the results are typically provided or generated instantaneously. However, as the size of the datasets starts growing exponentially, the join performance suffers significantly. This is because the join operation requires sorting and searching of the relevant data fields in the targeted datasets before producing an output dataset with the joined results.

The example embodiments relate to accepting a user's alias and credential, instead of a personal account number, for approving an online transaction. In an example, a merchant's checkout graphical user interface may have embedded therein multiple widgets that pass information at different times to a payment processor and an issuer. At a high level, a merchant's checkout graphical user interface may accept an issuer credential at checkout, facilitate an issuer authenticating the issuer credential, and, in response to successful authentication, the payment processor may provide the merchant with a payment token as payment for items being purchased from the merchant.

FIG. 1 illustrates a block diagram of a system 100 in accordance with example embodiments. System 100 may include a merchant server 102, a payment processor server 104, and at least one issuer server 106 communicatively coupled to one another and at least one user device 110 via one or more computer networks 108 (e.g., local area network, wide area network, wireless network, wired network, and the like, and/or some combination thereof). Issuer servers 106-1-106-n are depicted, where n is a positive integer.

A user device 110 may interact with a merchant server 102 to obtain a merchant's graphical user interface for viewing items (e.g., goods, services, and the like) for sale and making purchases from the merchant. An example of a merchant's graphical user interface (GUI) is a webpage. A third party server other than the merchant server 102 may serve the merchant's GUI to the user instead of, or in addition to, the merchant server 102. Instead of the merchant directly collecting payment from the user, the merchant may leverage technology provided by a payment processor and/or an issuer to collect payment. Advantageously, in accordance with the embodiments described herein, the merchant may shift risk of non-payment to the issuer, which often may be in a better position to assess risk than a merchant.

To provide this risk-shifting benefit, the merchant may integrate widgets into the merchant's GUI. In an example, a payment processor widget may control the user experience and facilitate interaction with an authentication widget of the issuer for verifying whether a credential provided by the user can be used to successfully authenticate the user.

In some examples, a user may pre-enroll in a payment processor checkout program to link an account a user has established with an issuer to a checkout account established with the payment processor. An issuer may be a bank that issues a credit or debit card to a user in association with a particular payment processor (e.g., VISA). Merchants may enroll in the checkout program of the payment processor so that customers can simply input an alias and credential, instead of a personal account number (e.g., credit card number), when making purchases online. It is typically simpler for a customer to remember an alias and a credential (e.g., username and password), as compared to a personal account number, thus making it easier for a customer to make an online purchase and more likely that the customer actually completes the purchase.

The user may establish an alias and a credential with the issuer permitting the user to obtain online access to the issuer account. For example, the issuer may provide an online banking platform and the user may input the alias and the credential (e.g., password) for authentication to access the issuer account and/or to make a transaction using the issuer account. The user may select the alias and credential or the issuer may assign them. If a user has accounts with different issuers, the user may use the same alias and credential pair or may assign a unique alias and credential for each issuer. An alias may be information for identifying a user. Examples of an alias include a username, an email address, phone number, device identifier (e.g., identifier of a computer, laptop, smartphone, tablet computer, etc.) and the like. A credential may be information for authenticating a user prior to making a transaction using an issuer account. An example of a credential is a password, biometric information (e.g., a thumbprint), and the like. The user may provide the alias and credential when desiring to make a transaction using the issuer account, such as to access the user's account in an online banking platform.

The issuer server 106 and the payment processor server 104 may link an issuer account with a checkout account by exchanging oAuth-like tokens such that the same alias/credential combination that user has established for online access to the issuer account may also be used when making purchases from a merchant via the checkout account. Beneficially, the user may supply the same alias/credential combination, instead of a personal account number (e.g., credit card number, debit card number, etc.), to the merchant's GUI when making online purchases.

Subsequent to pre-enrollment, a user may access a graphical user interface of a merchant that participates in the checkout program when desiring to purchase an item. In an example, the user may select one or more items and add them to a virtual shopping cart. When the user desires to make a purchase, the user may select a checkout icon on the merchant's GUI. In response to the selection, the merchant server 102 may present a merchant checkout GUI in a display screen of the user device 110. In an example, the merchant checkout GUI may list one or more items being purchased, a cost of each item, a total cost, and the like. The merchant checkout GUI may also include one or more widgets. A widget may be computer code downloaded from the merchant's server 102 and stored by memory of the user device 110. The computer code, when executed, may cause the user device 110 to access another computer, device, or service, to process received user input. For example, a widget may be computer code of an inline Frame (iframe) used to embed another document into an HTML document.

In one example, a first widget of the widgets may be a payment processor widget or checkout widget (hereinafter commonly referred to as checkout widget) associated with the payment processor. When the consumer arrives at the merchant GUI or any other time, the checkout widget may recognize the user's alias (e.g., based on a cookie, device/browser fingerprint, etc.) or the customer may provide his/her alias (e.g., username, email, mobile phone number, etc.) to the merchant GUI. The checkout widget may cause the user device 110 to send the alias to the payment processor server 104 for determining what accounts the user has with one or more issuers. Once determined, the checkout widget may cause the merchant checkout GUI to display one or more selectable graphics corresponding to accounts the user has with one or more issuers. Each selectable graphic may be a branded checkout button with card art. For example, a user may have a Bank of America issued Visa physical credit card with a background depicting a beach and ocean, and the branded checkout button may include an image in the shape of a credit card depicting the same beach and ocean.

To figure out with which issuers a user has an account, the checkout widget may pass user identifying information, such as device-based information and/or alias-based information to the payment processor server 104 for looking up the user's issuer affiliation(s). Examples of device-based information include a browser cookie, a device fingerprint, an advertiser identifier (e.g., Android), platform partnerships (e.g., MSFT, Mozilla, WC3), and the like. Examples of alias-based information include a hash of the user's email address and/or phone number, a user entered email address, a user entered mobile username, and the like.

Figure 2A:
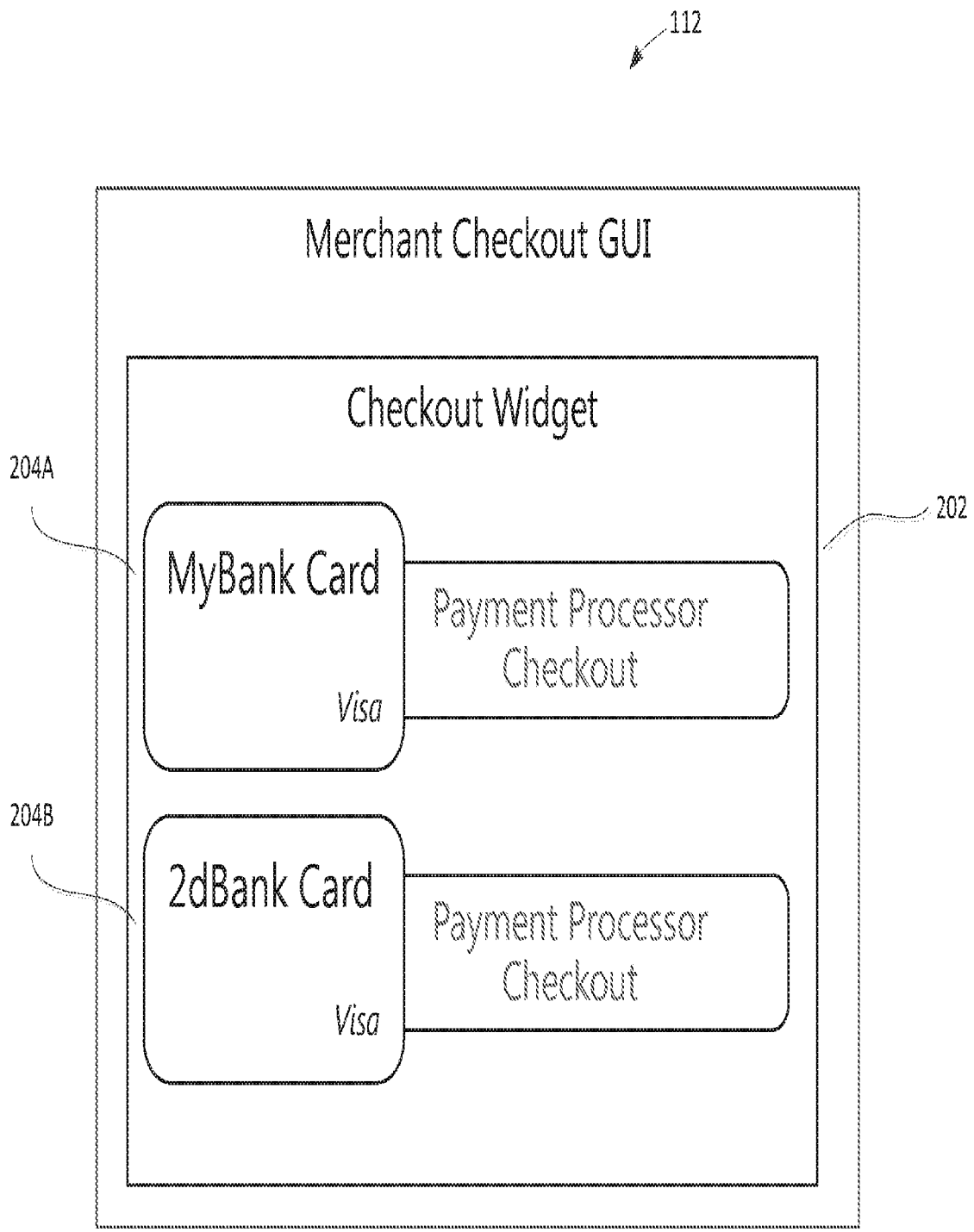
FIGS. 2A-B illustrate example merchant checkout graphical user interfaces in accordance with example embodiments.

The payment processor server 104 may process user identifying information, such as the device-based information and/or alias-based information to determine that the user has accounts with one or more different issuers. The payment processor server 104 may retrieve branded checkout buttons and associated card art for the user's corresponding accounts and send to the checkout widget. The checkout widget may update the merchant checkout GUI to display a branded checkout button for each issuer. The user may select one of the branded checkout buttons with which the user would like to authenticate against. In FIG. 2A, for example, a merchant checkout GUI 112 may display a checkout widget 202, a first branded checkout button 204A for the issuer "MyBank" associated with issuer server 106-1, and a second branded checkout button 204B for the issuer "2dBank" associated with issuer server 106-n. The user may choose between the first or second branded checkout button to indicate with which account the user desires to make payment. For example, the user may swipe a finger from left to right on a touchscreen of the user device 110 overtop of the desired branded checkout button to select which issuer account to use. Other manners of user selection may also be used. In the depicted example, the user may place a finger over the MyBank card image 204A and slide it from left to right overtop of phrase "Payment Processor Checkout."

In response to the user selection, the checkout widget 202 may update the merchant checkout GUI 112 to display or trigger a second widget corresponding to the selected issuer account for collecting a credential from the user. The second widget may be referred to as an authentication widget 206 and may interact with the issuer server 106-1 of the selected issuer account. For example, issuer server 106-1 may host a password field within the checkout widget 202 that is a user interface software developer kit for javascript. The authentication widget 206 may prompt the user to input a credential for that issuer account and pass the input credential to issuer server 106-n for authentication. In an example, the authentication widget 206 be configured to receive input from a displayed text input field, and the checkout widget 202 may control the appearance of the remainder of the merchant checkout GUI. The checkout widget 202 may render a portion of the merchant checkout GUI 112 having standardized dimensions and branding specifications for the authentication widget 206 to populate with a password field. The checkout widget 202 may also pass to the issuer the alias and metadata (e.g. amount, merchant category, merchant identifier, etc.).

Figure 2B:
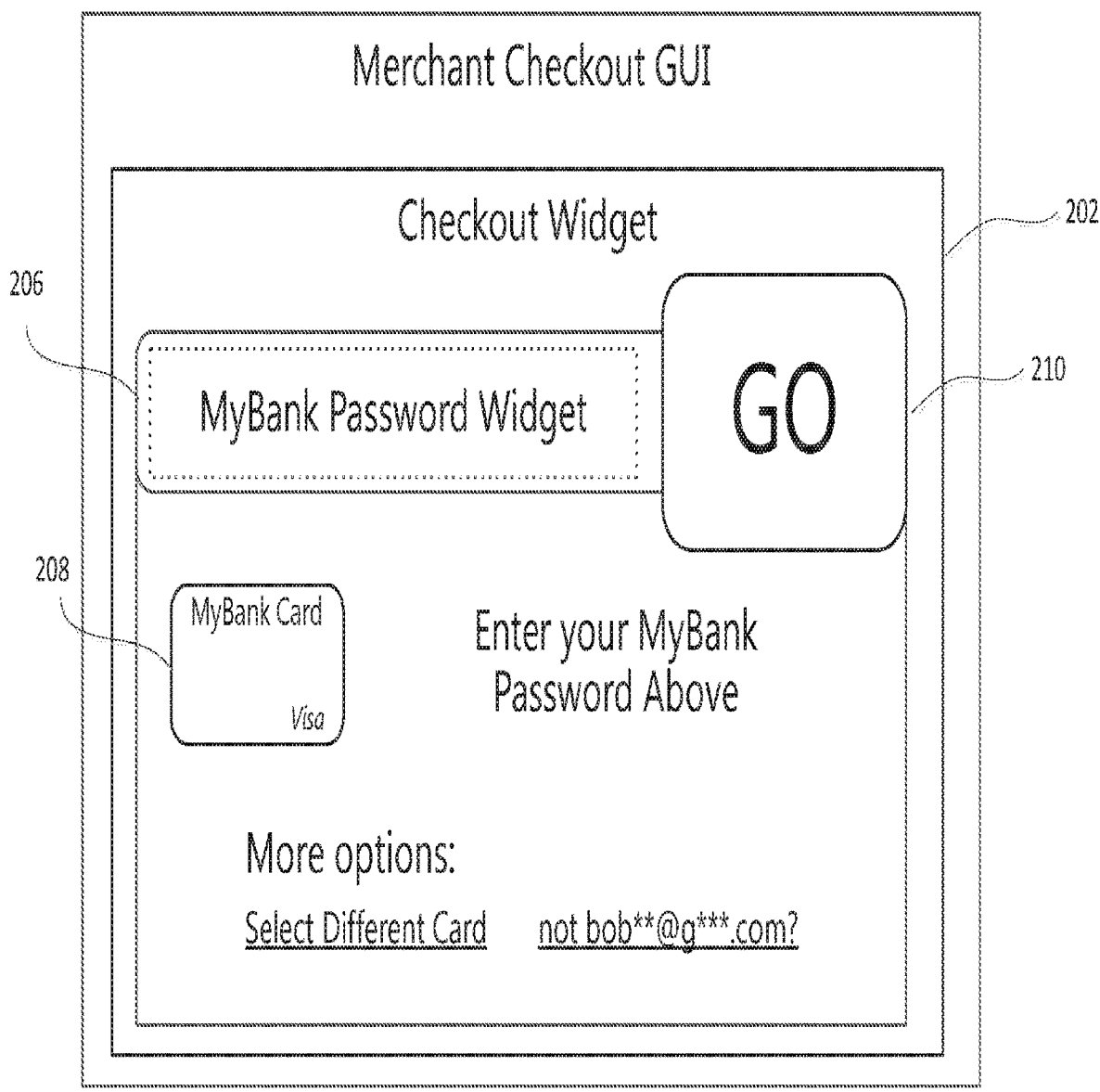

FIG. 2B depicts an example of the merchant checkout GUI 112 including the checkout widget 202 and the authentication widget 206. In the depicted example, the authentication widget 206 is a "MyBank Password Widget" prompting the user to input a password associated with a MyBank account the user established with the issuer "MyBank." To remind the user about the issuer account, the checkout widget 202 may update the merchant checkout GUI 112 to include card art 208 of the user's physical credit card for the selected issuer and at least a portion of the user's alias. In the depicted example, the checkout widget 202 updates the merchant checkout GUI 112 to present card art for the user's "MyBank Card." The merchant checkout GUI 112 may prompt the user to input the password associated with a MyBank account. In an example, the checkout widget 202 may cause the merchant checkout GUI 112 to display at least a portion of a user's alias associated with the issuer account to assist the user. Additionally, the checkout widget 202 may update the merchant checkout GUI 112 to permit the user to select a different card should the user desire to make payment using an alternate account.

In response to the user inputting a credential (e.g., and hitting a "Go" button 210), the authentication widget 206 may cause the user device 110 to forward the credential to the particular issuer server 106. In this example, the credential is forwarded to a MyBank issuer server 106-1. The authentication widget 206 may also forward contextual information to the particular issuer server 106 for assessing risk that the user is not the bona fide accountholder. The type of information communicated may vary based on a desired level of authentication. The level of authentication may depend on context, liability channel, and risk, may depend on which channel the user provides authentication (e.g., password, one time password, thumbprint, etc.), and may depend on which domain or window the user-supplied information is entered. In some examples, authentication methods may be channel dependent (e.g., web vs. sms vs. mobile app). Additionally, consumer preference, local network rules, or merchant preference, may also be authentication factors. In an example, the contextual information may include a phone number of the user device 110, a current geo-location of the user device 110, a browser/device fingerprint, metadata, and the like.

The issuer server 106-1 may process the received credential and/or the contextual information and attempt to authenticate the user. If the credential is incorrect and/or if the purchase is unusual based on the contextual information, the issuer server 106-1 may respond with an authentication response message indicating that the user did not provide the correct credential. In some examples, the user device 110 may inform the user that a supplied credential was incorrect and provide the user with one or more additional attempts to provide the correct credential.

If the credential is correct and/or the contextual information is not deemed to be unusual, the issuer server 106-1 may communicate an authentication response message to the payment processor server 104 having a successful authentication indicator for indicating successful authentication. An advantage of having the issuer, instead of the merchant, authenticate the user is that authentication risk is shifted from the merchant to the issuer. In many instances, the issuer has better resources and is in a better position for determining whether a transaction appears unusual. Typically, an issuer has access to a user's purchase history, typical geo-location of customer purchases, and the like for assessing whether a purchase appears to be unusual. In response to receiving indication that the user has been successfully authenticated, the payment processor server 104 may communicate a payment token to the merchant server 102 for use as payment. The merchant server 102 may then update the merchant checkout GUI 112 on the user device 110 to indicate that the user's purchase has been approved.

In some examples, after a user has been authenticated by an issuer and a particular transaction has been authorized, the payment processor server 104 may authorize similar transactions in the future without requiring the issuer to again authenticate the user. In one example, the payment processor server 104 may store a user's transaction history and contextual information on transactions where the issuer server 106 previously authenticated a user, and the payment processor server 104 may approve similar transactions in the future without requiring the issuer to again authenticate the user. For example, a user may frequently purchase toiletries from a particular website accessed by a particular user device (e.g., mobile phone) within a particular geo-location (e.g., San Francisco, Calif.) for a total amount that does not exceed $150. As long as contextual information associated with a subsequent purchase is consistent with contextual information from at least one previous purchase, the payment processor server 104 may approve the subsequent purchase and generate a payment token without requiring the issuer to authenticate a user prior to approving the transaction. In such a scenario, the checkout widget 202 may collect the alias/credential from the user and send the alias/credential to the payment processor server 104 for determining if the alias/credential match ones previously provided by the user in an earlier transaction. If there is a match, the payment processor server 104 may generate and communicate a payment token to the merchant server 102 for authorizing the transaction and making payment.

Figure 3A:
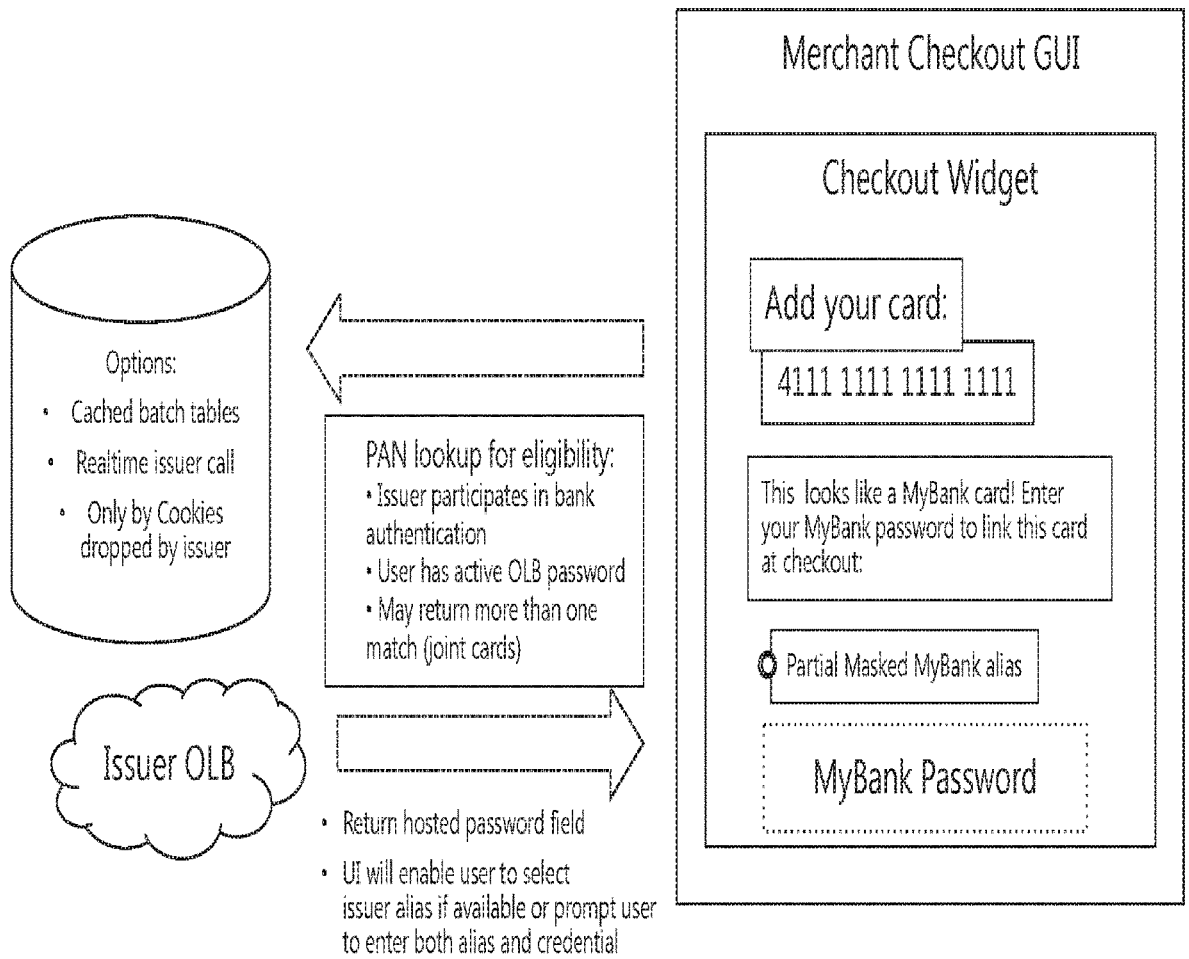
FIG. 3A illustrates a flow diagram for determining eligibility for a payment processor checkout program.

In a further example, the system 100 may enroll a previously un-enrolled user in the payment processor checkout program at the time a user is checking out, and thus does not require a user to pre-enroll as described above. With reference to FIG. 3A, the merchant server 102 may provide the merchant checkout GUI 112 for presentation to the user by the user device 110. As described above, the merchant checkout GUI 112 may include a checkout widget 202. During checkout, the checkout widget 202 may prompt the user to input a personal account number (PAN) (e.g., credit card number) to use for payment and may cause the user device 110 to forward the personal account number to the payment processor server 104. The payment processor server 104 may process the account number to determine (1) who the issuer is, (2) if the issuer provides online user authentication, and (3) if the user has an active alias and credential with the issuer (e.g., has set up an online banking username and password). If yes to all, the payment processor server 104 may determine that the user is eligible to sign up for the checkout program and thus may use the active alias and credential, instead of having to provide the personal account number, to make an online purchase. In an example, to make these determinations, the payment processor server 104 may (1) search cached batch tables stored in a database for the account number, (2) perform a real-time call to the issuer, and/or (3) determine if the personal account number is available in cookies dropped by the issuer.

If the issuer provides online user authentication and the user has an active alias and credential, the payment processor server 104 may send a checkout eligible message to the issuer server 106. In response, the issuer server 106 may communicate an authentication widget 206 to the user device 110. In some examples, the authentication widget 206 may include the alias (e.g., username). The authentication widget 206 may cause the merchant checkout GUI 112 to display at least a portion of the alias, and prompt the user to input the credential associated with the issuer. The authentication widget 206 may communicate the credential to the issuer server 106 attempting to authenticate the user in the manner described above. If successfully authenticated, the issuer server 106 may notify the payment processor server 104 of successful authentication and the payment processor server 104 may generate and communicate a payment token to the merchant server 102, as described above. The merchant server 102 may cause the merchant checkout GUI 112 to inform the user of successful payment and of enrollment in the payment processor checkout program. To make subsequent purchases, the checkout widget 202 may display at least a portion of the alias and the authentication widget 206 may interact with the issuer server 106 for authenticating the user. Thus, a user may not have to remember or input a personal account number to make purchases, and instead may simply provide a credential and/or an alias. In other examples, the payment processor server 104 may approve a transaction based on contextual information without requiring separate user authentication by the issuer server 106, as described above.

Figure 3B:
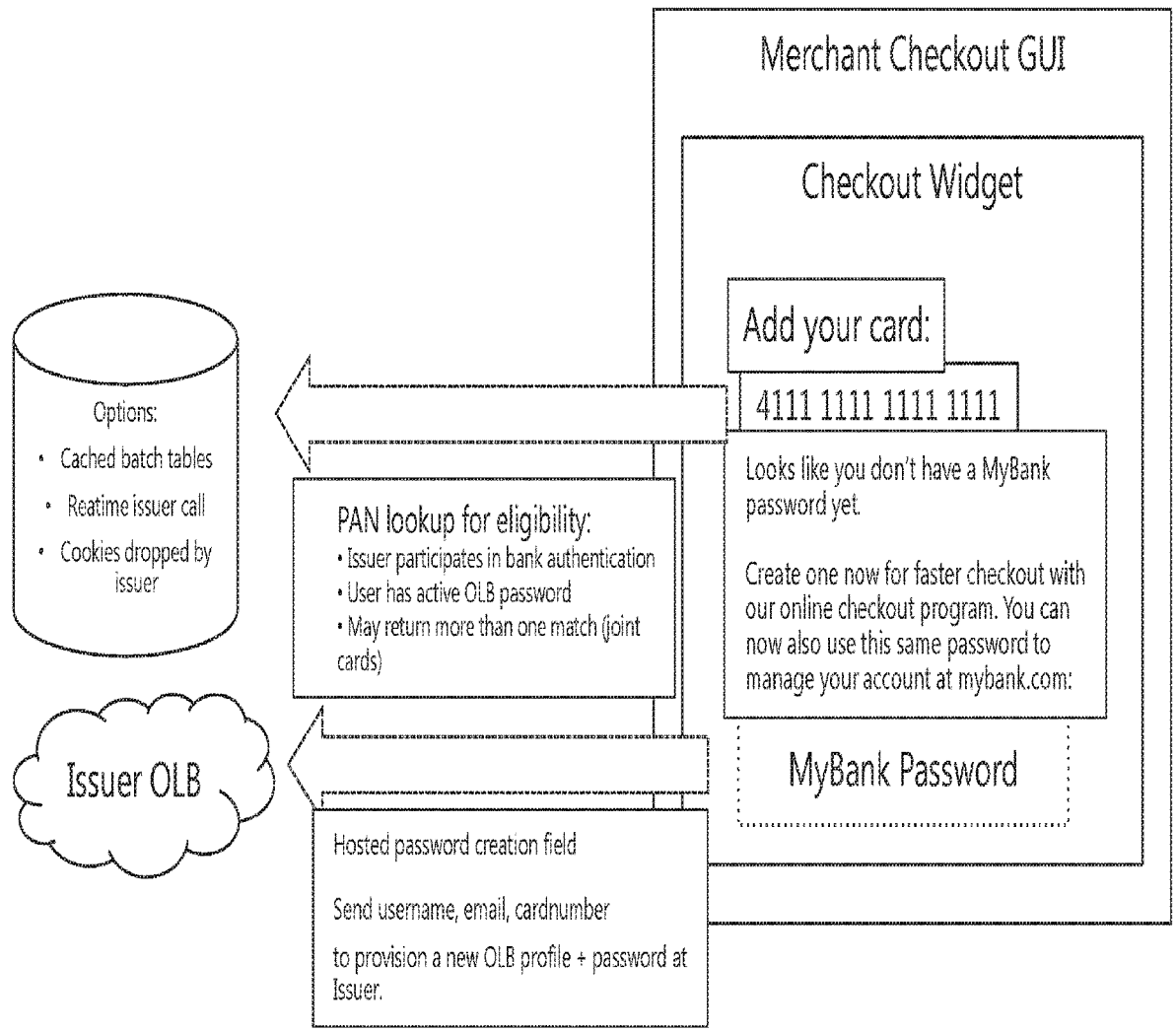
FIG. 3B illustrates a flow diagram for enrolling a user in a checkout program and an online issuer platform in accordance with example embodiments.

In another example, a user may enroll with the checkout program but may not yet have established an alias and credential for online access to an issuer's online platform (e.g., an online banking platform). During enrollment, the checkout widget 202 may, alone or in conjunction with the payment processor server 104 and/or the issuer server 106, determine that a personal account number input by the user is associated with an issuer account but the user has not yet set up an alias and credential for accessing an issuer's online platform. If not set up, the checkout widget 202 may present an authentication widget 206 for displaying a field prompting a user to provide an alias and to create a credential (e.g., "It looks like you don't have a MyBank password yet, create one now and use it for checkout in the future and to manage your account at mybank.com"). The authentication widget 206 may cause the user device 110 to pass the alias and user-created credential to the issuer server 106 for storage, as shown in FIG. 3B. In some examples, the authentication widget 206 may directly pass the alias and user-created credential to the issuer server 106 and not to the payment processor server 104, which may not be aware of nor store the user-created credential. The payment processor server 104 may also pass additional information about the user (e.g., home address, phone number, personal account number, social security number, and the like) to the issuer server 106 to provision a profile for the user's account with the issuer. In an example, the issuer may use the profile to enroll the user in an online platform and use the alias/credential for accessing the issuer's online platform. The payment processor server 104 may also send a welcome message (e.g., an email) co-branded with issuer to tell the user how to access his/her issuer accounts online via the issuer's online platform using the same alias/credential created for the checkout program. In some examples, the user may still have to agree to terms or do some other minor setup steps on first usage of the issuer's online platform, but the user may use the same password for the issuer's online platform as used to make purchases via the checkout program.

The example embodiments may further provide functionality to remind a user at checkout to sign up for the issuer's online platform and the checkout program. In an example, the issuer may embed a checkout widget 202 (e.g., software developer kit for javascript) in the issuer's online banking browser/app channels to capture device-based recognition (e.g., cookie/device fingerprint, etc.). Via a browser or app, the issuer may present a splash screen inviting the user to enroll now or "remind me later". For example, the checkout widget 202 may present a dynamic button that uses device recognition to serve an issuer-branded button to entice clicks from an un-enrolled user. If a click is received, the checkout widget 202 may cause the user device 110 to present a co-branded display to welcome the new user, and prompt the user to input the alias/credential and agree to the payment processor's terms. Once agreed, the checkout widget 202 may provision the checkout account by a cross-channel connected card application programming interface. This example embodiment may provide a number of benefits, including identifying customers who are enrolled in the issuer's online banking platform, serving to users dynamic buttons with issuer branding to entice clicks and new enrollments, and assisting in organically acquiring users compared to other systems.

Figure 4:
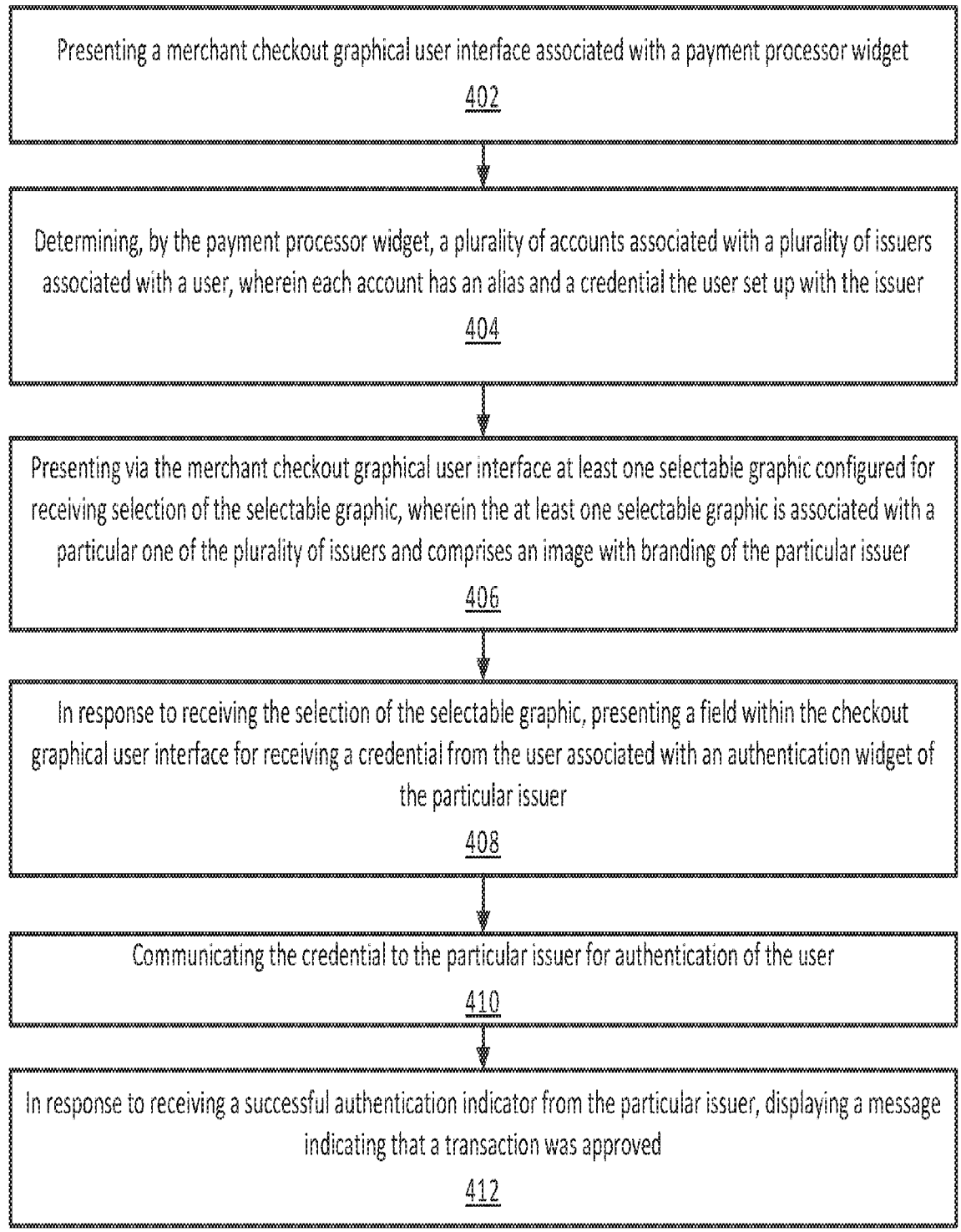
FIG. 4 illustrates a flow chart of a method in accordance with example embodiments.

FIG. 4 illustrates a flow chart of a method in accordance with example embodiments. The flow diagram may be implemented by a system, computer, server, or apparatus. Each of the blocks shown in the flow diagram may be repeated one or more times, one or more of the blocks may be modified, and one or more of the blocks may be omitted. The method may be stored on a non-transitory computer readable medium as computer executable instructions. The computer executable instructions, when executed by at least one processor, may cause at least one computer or other device to perform the blocks as steps of a method one or more times. The flow diagram may begin at block 402.

In block 402, the method may include presenting a merchant checkout graphical user interface associated with a payment processor widget. In one example, the payment processor server 104 may define the checkout widget with one or more graphical user interface elements for interactions with the user.

In block 404, the method may include determining, by the payment processor widget, a plurality of accounts associated with a plurality of issuers associated with a user, wherein each account has an alias and a credential the user set up with the issuer.

In block 406, the method may include presenting via the merchant checkout graphical user interface at least one selectable graphic configured for receiving selection of the selectable graphic, wherein the at least one selectable graphic is associated with a particular one of the plurality of issuers and comprises an image with branding of the particular issuer.

In block 408, the method may include in response to receiving the selection of the selectable graphic, presenting a field within the checkout graphical user interface for receiving a credential from the user associated with an authentication widget of the particular issuer.

In block 410, the method may include communicating, by the authentication widget, the credential to the particular issuer for authentication of the user.

In block 412, the method may include in response to receiving a successful authentication indicator from the particular issuer, displaying a message indicating that a transaction was approved.

The method of FIG. 4 may end, may repeat one or more times, or may return to any of the preceding blocks.

Advantageously, the example embodiments may provide a number of benefits. The example embodiments may securely protect user PAI and personally identifiable information (PII), may not require a user to establish a separate password for each of the checkout program and an issuer's online platform, may reduce context switching and user experience friction, may be flexible, and may support layered authentication options for different use cases.

Further, the example embodiments may limit the number of times a user has to provide a credential. For example, a credential may only be required for one-off transactions, for a first transaction with a new merchant or merchant app, or when shift of liability from a merchant to an issuer (or from a payment processor to an issuer) is requested.

In some use cases, the example embodiments may provide risk-based authentication and allow one-tap checkouts at the merchant's checkout GUI, with liability shift without requiring user to enter a credential. The example embodiments may further support card-on-file merchant use-cases (with merchant liability).

Moreover, the example embodiments may provide technical solutions to technical challenges. Existing systems provide unnecessary friction to customers when attempting to make an online purchase by failing to coordinate a payment processor and issuers, thereby reducing the merchant's sales. The example embodiments provide technical solutions to these technical challenges by linking a payment processor's checkout account to an issuer account a user has established with an issuer's online platform. This permits a user to use the same alias and credential when making purchases from a merchant and for accessing the issuer's online platform.

The computers and servers in FIG. 1 may be general purpose computers that may have, among other elements, a microprocessor (such as from the Intel Corporation, AMD or Motorola); volatile and non-volatile memory; one or more mass storage devices (i.e., a hard drive); various user input devices, such as a mouse, a keyboard, or a microphone; and a video display system. The computers and servers in FIG. 1 may be running on any one of many operating systems including, but not limited to WINDOWS, UNIX, LINUX, MAC OS, or Windows (XP, VISTA, etc.). It is contemplated, however, that any suitable operating system may be used for the present invention. The computers and servers in FIG. 1 may be a cluster of web servers, which may each be LINUX based and supported by a load balancer that decides which of the cluster of web servers should process a request based upon the current request-load of the available server(s).

The computers and servers in FIG. 1 are shown interconnected be lines. The lines may represent networks, including the Internet, WAN, LAN, Wi-Fi, other computer networks (now known or invented in the future), and/or any combination of the foregoing. It should be understood by those of ordinary skill in the art having the present specification, drawings, and claims before them that networks may connect the various components over any combination of wired and wireless conduits, including copper, fiber optic, microwaves, and other forms of radio frequency, electrical and/or optical communication techniques. It should also be understood that any network may be connected to any other network in a different manner. The interconnections between computers and servers in system 100 are examples. Any device depicted in FIG. 1 may communicate with any other device via one or more networks.

System 100 may include additional devices and networks beyond those shown. Further, the functionality described as being performed by one device may be distributed and performed by two or more devices. Multiple devices shown in FIG. 1 may also be combined into a single device, which may perform the functionality of the combined devices.

The various participants and elements described herein may operate one or more computer apparatuses to facilitate the functions described herein. Any of the elements in the above-described Figures, including any servers, user terminals, or databases, may use any suitable number of subsystems to facilitate the functions described herein.

Any of the software components or functions described in this application, may be implemented as software code or computer readable instructions that may be executed by at least one processor using any suitable computer language such as, for example, Java, C++, or Perl using, for example, conventional or object-oriented techniques.

The software code may be stored as a series of instructions or commands on a non-transitory computer readable medium, such as a random access memory (RAM), a read only memory (ROM), a magnetic medium such as a hard-drive or a floppy disk, or an optical medium such as a CD-ROM. Any such computer readable medium may reside on or within a single computational apparatus and may be present on or within different computational apparatuses within a system or network.

It may be understood that the present invention as described above can be implemented in the form of control logic using computer software in a modular or integrated manner. Based on the disclosure and teachings provided herein, a person of ordinary skill in the art may know and appreciate other ways and/or methods to implement the present invention using hardware, software, or a combination of hardware and software.

The above description is illustrative and is not restrictive. Many variations of the invention will become apparent to those skilled in the art upon review of the disclosure. The scope of the invention should, therefore, be determined not with reference to the above description, but instead should be determined with reference to the pending claims along with their full scope or equivalents.

One or more features from any embodiment may be combined with one or more features of any other embodiment without departing from the scope of the invention. A recitation of "a", "an" or "the" is intended to mean "one or more" unless specifically indicated to the contrary. Recitation of "and/or" is intended to represent the most inclusive sense of the term unless specifically indicated to the contrary.

One or more of the elements of the present system may be claimed as means for accomplishing a particular function. Where such means-plus-function elements are used to describe certain elements of a claimed system it will be understood by those of ordinary skill in the art having the present specification, figures and claims before them, that the corresponding structure is a general purpose computer, processor, or microprocessor (as the case may be) programmed to perform the particularly recited function using functionality found in any general purpose computer without special programming and/or by implementing one or more algorithms to achieve the recited functionality. As would be understood by those of ordinary skill in the art that algorithm may be expressed within this disclosure as a mathematical formula, a flow chart, a narrative, and/or in any other manner that provides sufficient structure for those of ordinary skill in the art to implement the recited process and its equivalents.

While the present disclosure may be embodied in many different forms, the drawings and discussion are presented with the understanding that the present disclosure is an exemplification of the principles of one or more inventions and is not intended to limit any one of the inventions to the embodiments illustrated.

The present disclosure provides a solution to the long-felt need described above. In particular, systems and methods described herein may be configured to coordinate a payment processor and issuers for linking accounts to accept payment via a merchant checkout graphical user interface. Further advantages and modifications of the above described system and method will readily occur to those skilled in the art. The disclosure, in its broader aspects, is therefore not limited to the specific details, representative system and methods, and illustrative examples shown and described above. Various modifications and variations can be made to the above specification without departing from the scope or spirit of the present disclosure, and it is intended that the present disclosure covers all such modifications and variations provided they come within the scope of the following claims and their equivalents.

What is claimed is:

1. A computer-implemented method comprising:
   instead of interacting with a user on a merchant device in a checkout process, presenting a merchant checkout graphical user interface on a display of a user device associated with a payment processor widget in the checkout process after interacting, by the payment processor widget, with a merchant;
   incorporating the payment processor widget into the merchant checkout graphical user interface as part of the checkout process;
   recognizing an alias associated with the user based on a device fingerprint associated with the user device of the user;
   in response to recognizing, determining, by the payment processor widget, a plurality of accounts associated with a plurality of issuers associated with the user;
   presenting, by the payment processor widget via the merchant checkout graphical user interface, at least one selectable graphic for receiving a selection, wherein the at least one selectable graphic is associated with a particular one of the plurality of issuers and comprises an image with branding of the particular one of the plurality of issuers;
   in response to receiving the selection of the at least one selectable graphic, presenting a field within the merchant checkout graphical user interface for receiving a credential from the user associated with an authentication widget of the particular one of the plurality of issuers, wherein the credential has been established with the particular one of the plurality of issuers;
   communicating, by the authentication widget, the credential to the particular issuer for authentication of the user; and
   in response to receiving a successful authentication indicator from the particular issuer, displaying a message indicating that a transaction with the merchant was approved.

2. The computer-implemented method of claim 1, wherein presenting comprises displaying the payment processor widget on the merchant checkout graphical user interface of the merchant, said merchant checkout graphical user interface comprising a webpage.

3. The computer-implemented method of claim 1, further comprising providing the payment processor widget from a payment processor to the merchant for presentment to the user, said payment processor being different from the merchant.

4. The computer-implemented method of claim 3, wherein the payment processor widget provides an outward appearance as though the merchant provides the payment processor widget and not the payment processor.

5. The computer-implemented method of claim 1, wherein determining comprises:
   identifying, by a payment processor via the payment processor widget, device-based information; and
   querying an issuer affiliation database of the payment processor to determine an affiliation between the device-based information and the user.

6. The computer-implemented method of claim 5, wherein determining comprises:
   identifying, by the payment processor via the payment processor widget, information based on the alias; and
   querying the issuer affiliation database of the payment processor to determine an affiliation between the alias-based information to the user.

7. A computer-implemented method comprising:
   instead of interacting with a user on a merchant device in a checkout process, defining a payment processor widget for displaying a merchant checkout graphical user interface on a display of a user device, said payment processor widget comprising a selectable graphic for presentation to the user during the checkout process;
   incorporating the payment processor widget into the merchant checkout graphical user interface as part of the checkout process;
   recognizing an alias associated with the user based on a device fingerprint associated with the user device of the user, the device fingerprint includes at least one of the following: a cookie, and a browser fingerprint;
   in response to recognizing, determining, by the payment processor widget, a plurality of accounts associated with a plurality of issuers associated with the user;
   presenting, by the payment processor widget via the merchant checkout graphical user interface, the selectable graphic for receiving a selection, wherein the selectable graphic is associated with a particular one of the plurality of issuers and comprises an image with branding of the particular one of the plurality of issuers;
   in response to receiving the selection of the selectable graphic, defining, by the payment processor widget, a data field within the merchant checkout graphical user interface for receiving a credential from the user, wherein the credential has been established with the particular one of the plurality of issuers;

in response to receiving the credential from the user in the data field, triggering an authentication widget of the particular one of the plurality of issuers affiliated with the received credential;

communicating, by the authentication widget, the credential to the particular one of the plurality of issuers for authentication of the user; and in response to receiving a successful authentication indicator from the particular issuer, displaying a message indicating that a transaction with the merchant was approved.

8. The computer-implemented method of claim 7, wherein defining comprises displaying the payment processor widget on the merchant checkout graphical user interface of the merchant, said merchant checkout graphical user interface comprising a webpage.

9. The computer-implemented method of claim 7, further comprising providing the payment processor widget from a payment processor to the merchant for presentment to the user, said payment processor being different from the merchant.

10. The computer-implemented method of claim 9, wherein the payment processor widget provides an outward appearance as though the merchant provides the payment processor widget and not the payment processor.

11. The computer-implemented method of claim 7, wherein determining comprises:
identifying, by a payment processor via the payment processor widget, one of following user identifying information: device-based information and information based on the alias; and
querying an issuer affiliation database of the payment processor to determine an affiliation between the user identifying information and the user.

12. The computer-implemented method of claim 9, further comprising generating, by the payment processor via the payment processor widget, a payment token to be communicated to the merchant.

13. The computer-implemented method of claim 9, further comprising:
identifying a previous authenticated transaction between the user and another particular issuer;
receiving a request to authenticate a subsequent similar transaction to the previous authenticated transaction;
in response to the receiving, verifying contextual information associated with the subsequent similar transaction is consistent with contextual information of the previous authenticated transaction;
in response to the verification being positive, generating a payment token to be communicated to the merchant, said payment token authenticating the subsequent similar transaction without requiring the credentials from the user on the data field.

14. A computer-implemented system comprising:
a memory for storing a database storing data of user accounts;
a computer network electronically connecting the memory with a computing device of a merchant;
a payment processor, accessible by the memory via the computer network, configured to execute computer-executable instructions for:
instead of interacting with a user on a merchant device in a checkout process, defining a first widget for displaying a merchant checkout graphical user interface on a user device, said first widget comprising a selectable graphic for presentation to the user in the checkout process;
incorporating the first widget into the merchant checkout graphical user interface as part of the checkout process;
recognizing an alias associated with the user based on a device fingerprint associated with the user device of the user;
in response to recognizing, determining, by the first widget, a plurality of accounts associated with a plurality of issuers associated with the user;
presenting, by the first widget via the merchant checkout graphical user interface, the selectable graphic for receiving a selection, wherein the selectable graphic is associated with a particular one of the plurality of issuers and comprises an image with branding of the particular one of the plurality of issuers;
in response to receiving the selection of the selectable graphic, defining, by the first widget, a data field within the merchant checkout graphical user interface for receiving a credential from the user, wherein the credential has been established with the particular one of the plurality of issuers;
in response to receiving the credential from the user in the data field, triggering a second widget of the particular one of the plurality of issuers affiliated with the received credential;
communicating, by the second widget, the credential to the particular issuer for authentication of the user; and
in response to receiving a successful authentication indicator from the particular one of the plurality of issuers, displaying a message indicating that a transaction was approved.

15. The computer-implemented system of claim 14, wherein the payment processor is further configured to execute computer-executable instructions for:
identifying a previous authenticated transaction between the user and another particular issuer;
receiving a request to authenticate a subsequent similar transaction to the previous authenticated transaction;
in response to the receiving, verifying contextual information associated with the subsequent similar transaction is consistent with contextual information of the previous authenticated transaction;
in response to the verification being positive, generating a payment token to be communicated to the merchant, said payment token authenticating the subsequent similar transaction without requiring the credentials from the user on the data field.

16. The computer-implemented system of claim 14, wherein the payment processor executes computer-executable instructions to display the first widget on the merchant checkout graphical user interface of the merchant, said merchant checkout graphical user interface comprising a webpage.

17. The computer-implemented system of claim 14, wherein the first widget provides an outward appearance as though the merchant provides the first widget and not the payment processor.

18. The computer-implemented system of claim 14, wherein determining comprises:
identifying device-based information of the user; and
querying an issuer affiliation database in the memory to determine an affiliation between the device-based information and the user.

19. The computer-implemented system of claim 18, determining comprises:
identifying information based on the alias of the user; and querying the issuer affiliation database in the memory to determine an affiliation between the alias-based information and the user.

20. The computer-implemented system of claim 14, further generating a payment token to be communicated to the merchant.

* * * * *